(12) United States Patent
Huang

(10) Patent No.: US 12,514,459 B2
(45) Date of Patent: Jan. 6, 2026

(54) WEARABLE BLOOD PRESSURE MEASUREMENT APPARATUS AND BLOOD PRESSURE MEASUREMENT METHOD

(71) Applicant: Huawei Technologies Co., Ltd., Shenzhen (CN)

(72) Inventor: Zhenlong Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1013 days.

(21) Appl. No.: 17/561,238

(22) Filed: Dec. 23, 2021

(65) Prior Publication Data

US 2022/0110531 A1 Apr. 14, 2022

Related U.S. Application Data

(63) Continuation of application No. PCT/CN2020/098027, filed on Jun. 24, 2020.

(30) Foreign Application Priority Data

Jun. 26, 2019 (CN) .......................... 201910560323.9

(51) Int. Cl.
*A61B 5/022* (2006.01)
*A61B 5/00* (2006.01)
*A61B 5/021* (2006.01)

(52) U.S. Cl.
CPC .......... *A61B 5/022* (2013.01); *A61B 5/02141* (2013.01); *A61B 5/681* (2013.01); *A61B 2562/0247* (2013.01)

(58) Field of Classification Search
None
See application file for complete search history.

(56) References Cited

U.S. PATENT DOCUMENTS

| 6,151,968 | A | 11/2000 | Chou |
|---|---|---|---|
| 9,642,541 | B2 | 5/2017 | Sawanoi |
| 10,201,285 | B2 | 2/2019 | Sawanoi et al. |
| 2014/0163402 | A1 | 6/2014 | Lamego et al. |

(Continued)

FOREIGN PATENT DOCUMENTS

| CN | 101578066 A | 11/2009 | |
|---|---|---|---|
| CN | 102307519 A | * 1/2012 | ........... A61B 5/0225 |

(Continued)

*Primary Examiner* — Jay B Shah
(74) *Attorney, Agent, or Firm* — SLATER MATSIL, LLP

(57) ABSTRACT

A wearable blood pressure measurement apparatus includes a measurement apparatus body, a binding component, an inflation component, a gas pressure sensor, a gas bag and a pressure sensor. The pressure sensor is configured to collect a current pressure value of the binding component, the measurement apparatus body is configured to determine whether the current pressure value is greater than a preset first pressure threshold, the inflation component is configured to inflate the gas bag, the gas pressure sensor is configured to collect a current gas pressure value of the gas bag, the measurement apparatus body is further configured to, when the current gas pressure value reaches a preset gas pressure threshold, determine inflation duration of the gas bag, and determine whether the inflation duration is greater than a preset first duration threshold.

17 Claims, 5 Drawing Sheets

(56) References Cited

U.S. PATENT DOCUMENTS

2020/0085319 A1   3/2020  Lin
2020/0253556 A1   8/2020  Nakajima et al.

FOREIGN PATENT DOCUMENTS

| | | | | |
|---|---|---|---|---|
| CN | 102772202 | A | 11/2012 | |
| CN | 102843963 | A | 12/2012 | |
| CN | 105125195 | A | 12/2015 | |
| CN | 105361872 | A | 3/2016 | |
| CN | 206995253 | U | 2/2018 | |
| CN | 108042122 | A | 5/2018 | |
| CN | 108378838 | A | 8/2018 | |
| JP | 2012147995 | A * | 8/2012 | ............ G09G 3/003 |
| JP | 2019097924 | A | 6/2019 | |
| WO | 2018099389 | A1 | 6/2018 | |
| WO | 2018150750 | A1 | 8/2018 | |

\* cited by examiner

WEARABLE BLOOD PRESSURE MEASUREMENT APPARATUS AND BLOOD PRESSURE MEASUREMENT METHOD

CROSS-REFERENCE TO RELATED APPLICATIONS

This is a continuation of International Application No. PCT/CN2020/098027, filed on Jun. 24, 2020, which claims priority to Chinese Patent Application No. 201910560323.9, filed on Jun. 26, 2019. The disclosures of the aforementioned applications are hereby incorporated by reference in their entireties.

TECHNICAL FIELD

This application relates to the field of terminal technologies, and in particular, to a wearable blood pressure measurement apparatus and a blood pressure measurement method.

BACKGROUND

Currently, an electronic sphygmomanometer has become an essential measurement instrument for a hypertensive patient. The hypertensive patient uses the electronic sphygmomanometer to measure blood pressures (for example, a systolic blood pressure (SBP) and a diastolic blood pressure (DBP)) of the patient, and properly adjusts living habits and medications with reference to advice of a doctor, so as to control hypertension and achieve a therapeutic goal. A conventional electronic sphygmomanometer (for example, an arm sphygmomanometer and a wrist sphygmomanometer) is large and heavy and should not be worn for a long time. To solve the above problems of the conventional electronic sphygmomanometer, a blood pressure watch appears. Compared with the conventional electronic sphygmomanometer, the blood pressure watch reduces a width of a gas bag and a size of a watch body, so that a size and a weight of the blood pressure watch are greatly reduced, and the hypertensive patient can wear the blood pressure watch for a long time.

However, when using the blood pressure watch to measure a blood pressure, the hypertensive patient needs to properly adjust a degree of tightness of a watch band of the blood pressure watch in strict accordance with a wrist circumference of the patient, so as to ensure accuracy of blood pressure measurement. If the watch band is too loose, the measured blood pressure is higher than an actual blood pressure, and if the watch band is too tight, the measured blood pressure is lower than the actual blood pressure. Therefore, there is an urgent need for a blood pressure watch capable of indicating a degree of tightness of a watch band.

SUMMARY

Embodiments of this application provide a wearable blood pressure measurement apparatus and a blood pressure measurement method, to improve accuracy of blood pressure measurement. The technical solutions are as follows.

According to a first aspect, a wearable blood pressure measurement apparatus is provided, where the wearable blood pressure measurement apparatus includes a measurement apparatus body (110), a binding component (120), an inflation component (130), a gas pressure sensor (140), and a gas bag (150) and a pressure sensor (160) that are disposed inside or on an inner side of the binding component (120), the measurement apparatus body (110) is separately connected to the binding component (120), the inflation component (130), the gas pressure sensor (140), and the pressure sensor (160), and the gas bag (150) is separately connected to the inflation component (130) and the gas pressure sensor (140), the pressure sensor (160) is configured to collect a current pressure value of the binding component (120), and send the collected current pressure value to the measurement apparatus body (110), the measurement apparatus body (110) is configured to receive the current pressure value, and determine whether the current pressure value is greater than a preset first pressure threshold, the inflation component (130) is configured to inflate the gas bag (150), the gas pressure sensor (140) is configured to collect a current gas pressure value of the gas bag (150), and send the collected current gas pressure value to the measurement apparatus body (110), the measurement apparatus body (110) is further configured to receive the current gas pressure value, and when the current gas pressure value reaches a preset gas pressure threshold, determine inflation duration of the gas bag (150), and determine whether the inflation duration is greater than a preset first duration threshold, and the measurement apparatus body (110), the inflation component (130), the gas pressure sensor (140), and the gas bag (150) are further configured to measure a systolic blood pressure (SBP) and a diastolic blood pressure (DBP) of a user.

In a possible implementation, the measurement apparatus body (110) is further configured to when receiving a blood pressure measurement instruction, send a pressure collection instruction to the pressure sensor (160), and the pressure sensor (160) is further configured to receive the pressure collection instruction, collect the current pressure value of the binding component (120) based on the pressure collection instruction, and send the collected current pressure value to the measurement apparatus body (110).

In a possible implementation, the measurement apparatus body (110) is further configured to if the current pressure value is less than or equal to the preset first pressure threshold, send an inflation instruction to the inflation component (130) and send a gas pressure collection instruction to the gas pressure sensor (140), the inflation component (130) is further configured to receive the inflation instruction, and inflate the gas bag (150) based on the inflation instruction, and the gas pressure sensor (140) is further configured to receive the gas pressure collection instruction, collect the current gas pressure value of the gas bag (150) based on the gas pressure collection instruction, and send the collected current gas pressure value to the measurement apparatus body (110).

In a possible implementation, the measurement apparatus body (110) is further configured to if the current pressure value is greater than the first pressure threshold, remind the user that a watch band is too tight.

In a possible implementation, the measurement apparatus body (110) is further configured to if the inflation duration is greater than the preset first duration threshold, remind that the binding component (120) is too loose.

In a possible implementation, the measurement apparatus body (110), the inflation component (130), the gas pressure sensor (140), and the gas bag (150) are further configured to if the current pressure value is less than or equal to the first pressure threshold and the inflation duration is less than or equal to the preset first duration threshold, measure the systolic blood pressure (SBP) and the diastolic blood pressure (DBP) of the user.

In a possible implementation, the measurement apparatus body (110) is further configured to compensate for the SBP and the DBP based on the current pressure value, the inflation duration, a preset second pressure threshold, a preset second duration threshold, and a preset compensation algorithm.

In a possible implementation, the pressure sensor (160) is connected to the measurement apparatus body (110) by using a connection line (161), and the connection line (161) is in a serpentine shape.

In a possible implementation, the inflation component (130) and the gas pressure sensor (140) are disposed in the measurement apparatus body (110).

In a possible implementation, the gas bag (150) is separately connected to the inflation component (130) and the gas pressure sensor (140) by using a gas path provided at the bottom or on a side surface of the measurement apparatus body (110).

According to a second aspect, a blood pressure measurement method is provided, where the method is applied to the wearable blood pressure measurement apparatus according to any one of implementations in the first aspect, and the method includes the following.

The pressure sensor (160) collects a current pressure value of the binding component (120), and sends the collected current pressure value to the measurement apparatus body (110), the measurement apparatus body (110) receives the current pressure value, and determines whether the current pressure value is greater than a preset first pressure threshold, the inflation component (130) inflates the gas bag (150), the gas pressure sensor (140) collects a current gas pressure value of the gas bag (150), and sends the collected current gas pressure value to the measurement apparatus body (110), the measurement apparatus body (110) receives the current gas pressure value, and when the current gas pressure value reaches a preset gas pressure threshold, determines inflation duration of the gas bag (150), and determines whether the inflation duration is greater than a preset first duration threshold, and the measurement apparatus body (110), the inflation component (130), the gas pressure sensor (140), and the gas bag (150) measure a systolic blood pressure (SBP) and a diastolic blood pressure (DBP) of a user.

In a possible implementation, the method further includes the following.

When receiving a blood pressure measurement instruction, the measurement apparatus body (110) sends a pressure collection instruction to the pressure sensor (160), and the pressure sensor (160) receives the pressure collection instruction, collects the current pressure value of the binding component (120) based on the pressure collection instruction, and sends the collected current pressure value to the measurement apparatus body (110).

In a possible implementation, the method further includes the following.

If the current pressure value is less than or equal to the preset first pressure threshold, the measurement apparatus body (110) sends an inflation instruction to the inflation component (130), and sends a gas pressure collection instruction to the gas pressure sensor (140), the inflation component (130) receives the inflation instruction, and inflates the gas bag (150) based on the inflation instruction, and the gas pressure sensor (140) receives the gas pressure collection instruction, collects the current gas pressure value of the gas bag (150) based on the gas pressure collection instruction, and sends the collected current gas pressure value to the measurement apparatus body (110).

In a possible implementation, the method further includes the following.

If the current pressure value is greater than the first pressure threshold, the measurement apparatus body (110) reminds that the binding component (120) is too tight.

In a possible implementation, the method further includes the following.

If the inflation duration is greater than the preset first duration threshold, the measurement apparatus body (110) reminds that the binding component (120) is too loose.

In a possible implementation, the method further includes that the measurement apparatus body (110), the inflation component (130), the gas pressure sensor (140), and the gas bag (150) measure a systolic blood pressure (SBP) and a diastolic blood pressure (DBP) of a user includes the following.

If the current pressure value is less than or equal to the first pressure threshold and the inflation duration is less than or equal to the preset first duration threshold, the measurement apparatus body (110), the inflation component (130), the gas pressure sensor (140), and the gas bag (150) measure the systolic blood pressure (SBP) and the diastolic blood pressure (DBP) of the user.

In a possible implementation, the method further includes the following.

The measurement apparatus body (110) compensates for the SBP and the DBP based on the current pressure value, the inflation duration, a preset second pressure threshold, a preset second duration threshold, and a preset compensation algorithm.

According to a third aspect, an embodiment of this application provides a wearable blood pressure measurement apparatus, and the apparatus has a function of implementing behavior of the measurement apparatus in the method of any one of possible designs of the foregoing aspects. The function may be implemented by using hardware, or may be implemented by hardware executing corresponding software. The hardware or the software includes at least one module or unit corresponding to the function, for example, a measurement module or unit, a sensing module or unit, an inflation module or unit.

According to a fourth aspect, an embodiment of this application provides a computer storage medium, including computer instructions. When the computer instructions are run on a mobile terminal, the mobile terminal is enabled to perform the blood pressure measurement method in any one of possible designs of the foregoing aspects.

According to a fifth aspect, an embodiment of this application provides a computer program product. When the computer program product is run on a computer, the computer is enabled to perform the blood pressure measurement method in any one of possible designs of the foregoing aspects.

The embodiments of this application provide a wearable blood pressure measurement apparatus and a blood pressure measurement method. When receiving the blood pressure measurement instruction, the measurement apparatus body 110 collects the current pressure value of the binding component 120 by using the pressure sensor 160, and determines whether the current pressure value is greater than the preset first pressure threshold. If the current pressure value is greater than the first pressure threshold, the measurement apparatus body 110 reminds that the binding component 120 is too tight. If the current pressure value is less than or equal to the preset first pressure threshold, the measurement apparatus body 110 inflates the gas bag 150 by using the inflation component 130, and collects the current gas pressure value of the gas bag 150 by using the gas pressure sensor 140. When the current gas pressure value reaches the preset gas pressure threshold, the measurement apparatus body 110 determines the inflation duration of the gas bag 150, and determines whether the inflation duration is greater than the preset first duration threshold. If the inflation duration is greater than the preset first duration threshold, the measurement apparatus body 110 reminds that the binding component 120 is too loose. If the inflation duration is less than or equal to the preset first duration threshold, the measurement apparatus body 110 measures the systolic blood pressure (SBP) and the diastolic blood pressure (DBP) of the user by using the inflation component 130, the gas pressure sensor 140, and the gas bag 150. In this way, the wearable blood pressure measurement apparatus can detect, by using the inflation component 130, the gas pressure sensor 140, the gas bag 150, and the pressure sensor 160, a degree of tightness of the binding component 120 of the wearable blood pressure measurement apparatus worn by the user, thereby ensuring accuracy of blood pressure measurement.

DETAILED DESCRIPTION OF ILLUSTRATIVE EMBODIMENTS

Currently, to ensure accuracy of blood pressure measurement, blood pressure watches on the market are mainly classified into the following two types.

Figure 1A:
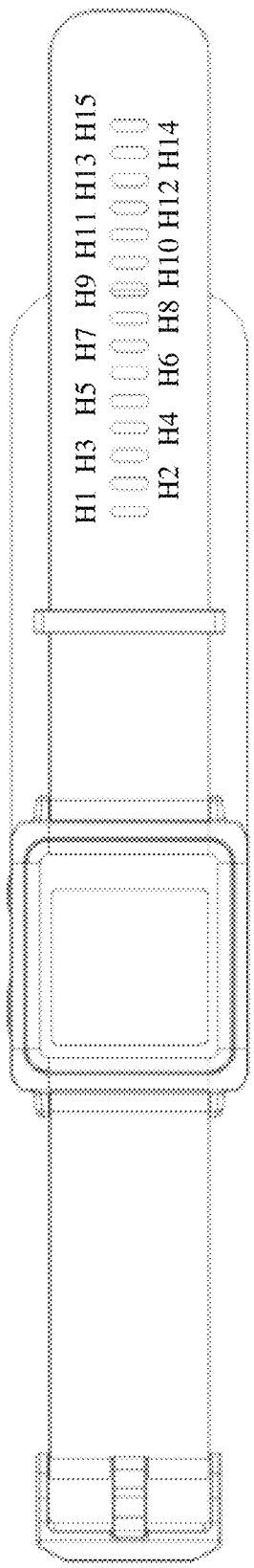
FIG. 1A is a schematic structural diagram of an existing blood pressure watch according to an embodiment of this application.

For a first type of blood pressure watch, as shown in FIG. 1A, a technical person provides adjustment holes on a watch band of the blood pressure watch, and specifies a correspondence between wrist circumferences of users and numbers of adjustment holes. When a user uses the blood pressure watch to measure a blood pressure, the user first needs to measure a wrist circumference at a specific location of a wrist of the user. Then, the user queries an adjustment hole of a target number corresponding to the wrist circumference based on the correspondence between wrist circumferences and numbers of adjustment holes, and wears the blood pressure watch based on the adjustment hole of the target number, so as to ensure accuracy of blood pressure measurement.

However, each time the user uses the blood pressure watch to measure a blood pressure, the user needs to measure a wrist circumference at a specific location of the wrist of the user, and determines an adjustment hole of a proper number based on the measured wrist circumference, resulting in poor user experience.

Figure 1B:
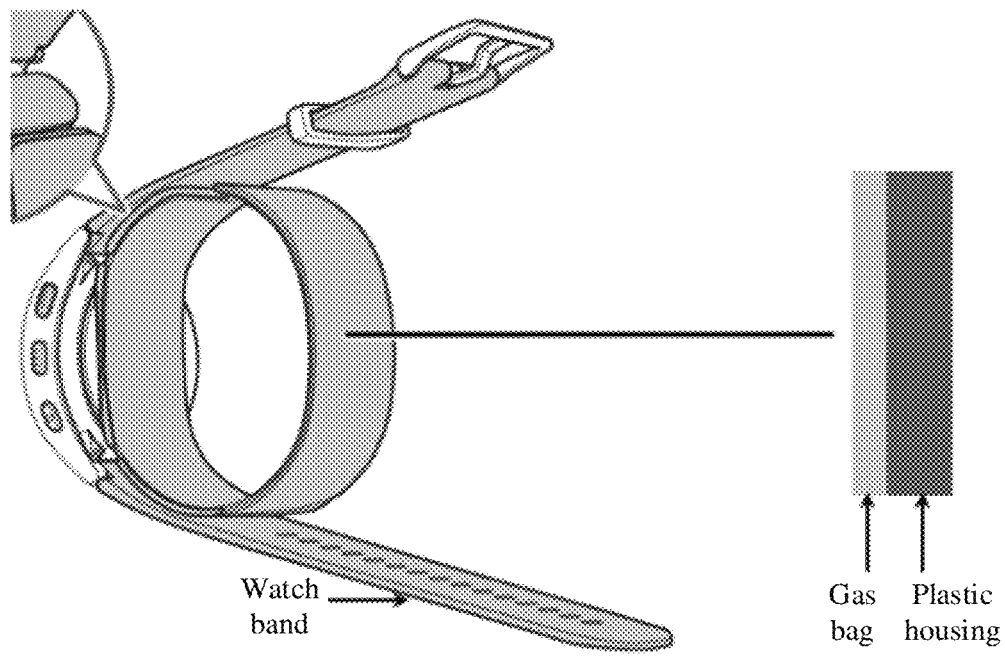
FIG. 1B is a schematic structural diagram of an existing blood pressure watch according to an embodiment of this application.

For a second type of blood pressure watch, as shown in FIG. 1B, a technical person disposes an annular plastic housing with specific hardness between a gas bag and a watch band of the blood pressure watch. When a user uses the blood pressure watch to measure a blood pressure, the gas bag may be tightly clasped around a wrist of the user by using the annular plastic housing. Because the annular plastic housing can be deformed with a wrist circumference of the user, it is ensured that a proper degree of tightness is kept between the gas bag and the wrist of the user, thereby ensuring accuracy of blood pressure measurement.

However, when the user uses the blood pressure watch to measure the blood pressure, the annular plastic housing presses the wrist of the user for a long time, resulting in discomfort to the user and poor user experience.

Figure 2A:
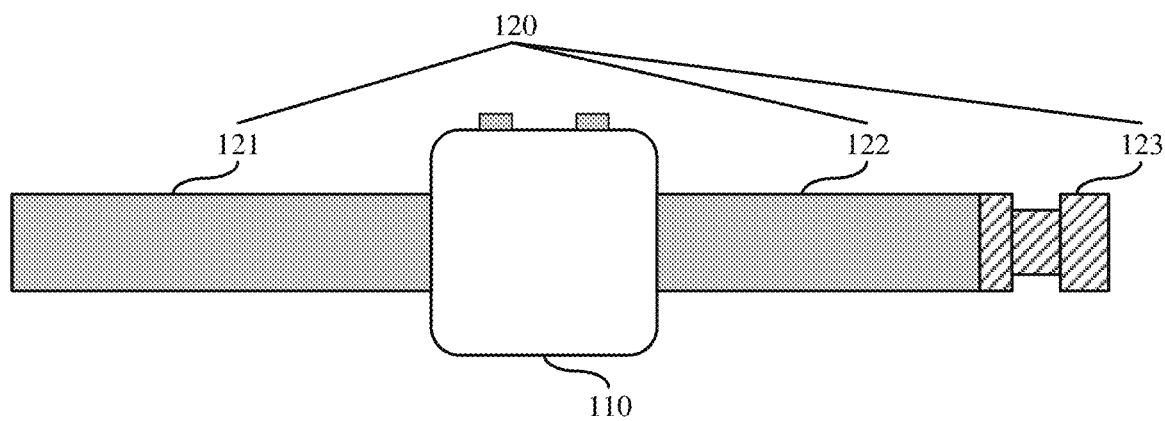
FIG. 2A is a front view of a wearable blood pressure measurement apparatus according to an embodiment of this application.
Figure 2B:
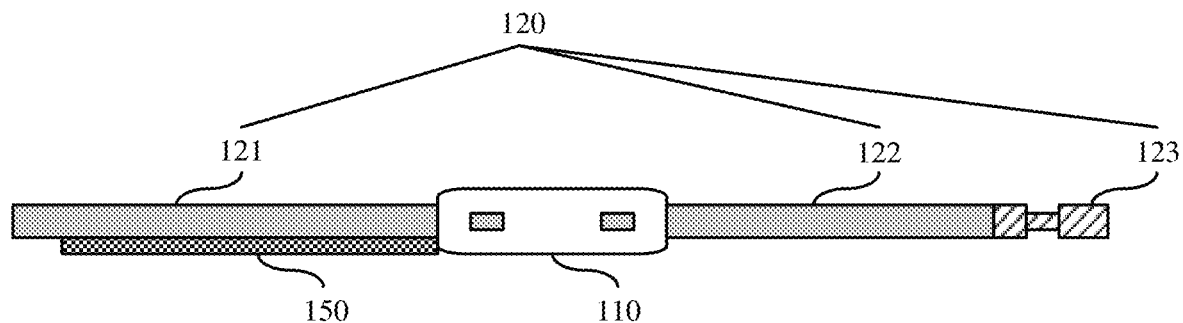
FIG. 2B is a side view of a wearable blood pressure measurement apparatus according to an embodiment of this application.
Figure 2C:
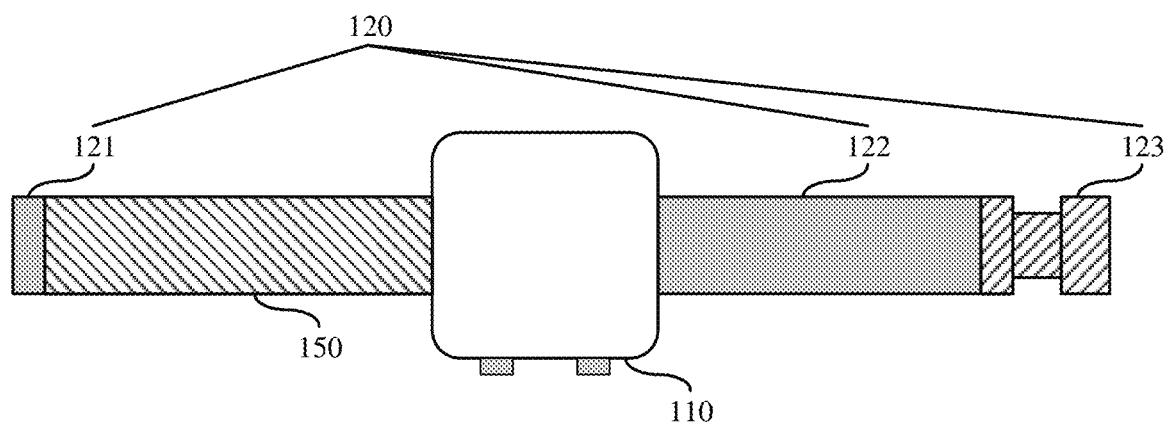
FIG. 2C is a rear view of a wearable blood pressure measurement apparatus according to an embodiment of this application.

An embodiment of this application provides a wearable blood pressure measurement apparatus, to detect a degree of tightness of a watch band when a user measures a blood pressure. As shown in FIG. 2A, FIG. 2B, and FIG. 2C, the wearable blood pressure measurement apparatus provided in this embodiment of this application includes a measurement apparatus body 110, a binding component 120, an inflation component 130 (not shown in the figures), a gas pressure sensor 140 (not shown in the figures), and a gas bag 150 and a pressure sensor 160 (not shown in the figures) that are disposed inside or on an inner side of the binding component 120. A connection relationship between components of the wearable blood pressure measurement apparatus is as follows.

The measurement apparatus body 110 is connected to the binding component 120.

During implementation, the binding component 120 may include a first watch band 121, a second watch band 122, and a watch buckle 123, or may be another type of binding component. This is not limited in this embodiment of this application. In this embodiment of this application, description is provided by using an example in which the binding component 120 includes the first watch band 121, the second watch band 122, and the watch buckle 123. Other cases are similar thereto. The measurement apparatus body 110 may be connected to the first watch band 121 and the second watch band 122 by using a watch spindle, or may be connected to the first watch band 121 and the second watch band 122 in another manner, or may be integrally formed with the first watch band 121 and the second watch band 122. This is not limited in this embodiment of this application. A user may connect the second watch band 122 to different locations of the first watch band 121 by using the watch buckle 123 disposed at the end of the second watch band 122, so that the user can adjust a degree of tightness of the binding component 120 based on a wrist circumference of a wrist of the user.

The measurement apparatus body 110 is connected to the pressure sensor 160, and is configured to when receiving a blood pressure measurement instruction, send a pressure collection instruction to the pressure sensor 160. The pressure sensor 160 is configured to receive the pressure collection instruction sent by the measurement apparatus body 110, collect a current pressure value of the binding component 120 based on the pressure collection instruction, and send the collected current pressure value to the measurement apparatus body 110. The measurement apparatus body 110 is further configured to receive the current pressure value sent by the pressure sensor 160, determine whether the current pressure value is greater than a preset first pressure threshold, and if the current pressure value is greater than the preset first pressure threshold, remind that the binding component 120 is too tight.

During implementation, the measurement apparatus body 110 is connected to the pressure sensor 160 disposed inside or on the inner side of the binding component 120. When the user needs to measure a blood pressure, the user may tap an icon for blood pressure measurement on a display interface of the measurement apparatus body 110, and the measurement apparatus body 110 detects a blood pressure measurement instruction. Optionally, the user may further set a measurement time for blood pressure measurement in the measurement apparatus body 110. When detecting that a current time is the measurement time, the measurement apparatus body 110 generates a blood pressure measurement instruction. Alternatively, when detecting that the user wears the wearable blood pressure measurement apparatus, the measurement apparatus body 110 automatically generates a blood pressure measurement instruction. Then, the measurement apparatus body 110 may send a pressure collection instruction to the pressure sensor 160. After receiving the pressure collection instruction sent by the measurement apparatus body 110, the pressure sensor 160 may collect a current pressure value of the binding component 120 based on the pressure collection instruction, and send the collected current pressure value of the binding component 120 to the measurement apparatus body 110. The measurement apparatus body 110 may pre-store the first pressure threshold. The first pressure threshold may be specified by a technical person based on experience. After receiving the current pressure value of the binding component 120 that is sent by the pressure sensor 160, the measurement apparatus body 110 may further determine whether the current pressure value is greater than the preset first pressure threshold. If the current pressure value is greater than the preset first pressure threshold, it indicates that the binding component 120 of the wearable blood pressure measurement apparatus worn by the user is too tight, and the measurement apparatus body 110 may display, on the display interface, prompt information indicating that the binding component 120 is too tight, to prompt the user to loosen the binding component 120 of the wearable blood pressure measurement apparatus.

Optionally, a connection line 161 of the pressure sensor 160 is connected to the measurement apparatus body 110, and the connection line 161 is in a serpentine shape.

Figure 3A:
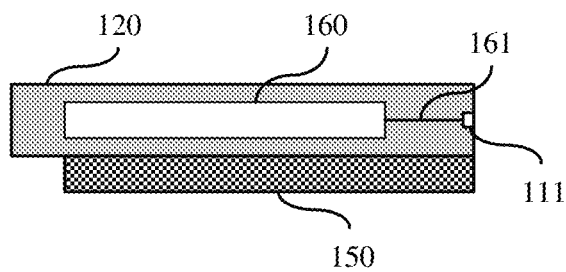
FIG. 3A is a cross-sectional view of a binding component according to an embodiment of this application.
Figure 3B:
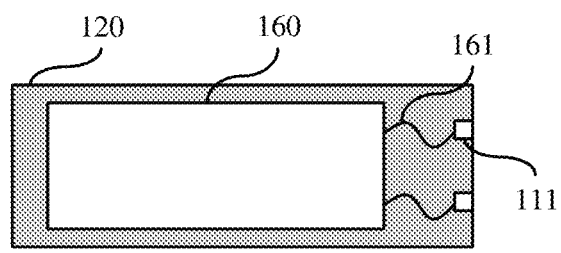
FIG. 3B is a top perspective view of a binding component according to an embodiment of this application.

During implementation, as shown in FIG. 3A and FIG. 3B, the pressure sensor 160 may be connected to an interface contact in of the measurement apparatus body 110 by using the connection line 161. The connection line 161 may be designed to have a serpentine shape. In this way, stress can be released in a process of bending or stretching the binding component 120, thereby ensuring stability of the connection line 161.

The measurement apparatus body 110 is separately connected to the inflation component 130 and the gas pressure sensor 140, and is configured to if the current pressure value is less than or equal to the preset first pressure threshold, send an inflation instruction to the inflation component 130 and send a gas pressure collection instruction to the gas pressure sensor 140. The inflation component 130 is connected to the gas bag 150 by using a gas path, and is configured to receive the inflation instruction sent by the measurement apparatus body 110, and inflate the gas bag 150 based on the inflation instruction. The gas pressure sensor 140 is connected to the gas bag 150 by using a gas path, and is configured to receive the gas pressure collection instruction sent by the measurement apparatus body 110, collect a current gas pressure value of the gas bag 150 based on the gas pressure collection instruction, and send the collected current gas pressure value to the measurement apparatus body 110. The measurement apparatus body 110 is further configured to receive the current gas pressure value sent by the gas pressure sensor 140, when the current gas pressure value reaches a preset gas pressure threshold, determine inflation duration of the gas bag 150, determine whether the inflation duration is greater than a preset first duration threshold, and if the inflation duration is greater than the preset first duration threshold, remind that the binding component 120 is too loose.

During implementation, the measurement apparatus body 110 is separately connected to the inflation component 130 and the gas pressure sensor 140, and each of the inflation component 130 and the gas pressure sensor 140 is connected to the gas bag 150 by using a gas path. Optionally, the inflation component 130 and the gas pressure sensor 140 may be disposed inside the measurement apparatus body 110, or may be disposed outside the measurement apparatus body 110, or may be disposed at other locations of the wearable blood pressure measurement apparatus. This is not limited in this embodiment of this application. The gas bag 150 may be disposed inside the binding component 120, or may be disposed on an inner side of the binding component 120. This is not limited in this embodiment of this application. The gas path may be provided at the bottom of the measurement apparatus body 110, or may be disposed on a side surface of the measurement apparatus body 110. This is not limited in this embodiment of this application.

After receiving the current pressure value of the binding component 120 that is sent by the pressure sensor 160, the measurement apparatus body 110 may further determine whether the current pressure value is greater than the preset first pressure threshold. If the current pressure value is less than or equal to the preset first pressure threshold, it indicates that the binding component 120 of the wearable blood pressure measurement apparatus worn by the user is not too tight, and the measurement apparatus body 110 may further send an inflation instruction to the inflation component 130 and send a gas pressure collection instruction to the gas pressure sensor 140. After receiving the inflation instruction sent by the measurement apparatus body 110, the inflation component 130 may inflate the gas bag 150 based on the inflation instruction. In addition, after receiving the gas pressure collection instruction sent by the measurement apparatus body 110, the gas pressure sensor 140 may collect a current gas pressure value of the gas bag 150 in a preset sampling period based on the gas pressure collection instruction, and send the collected current gas pressure value of the gas bag 150 to the measurement apparatus body 110. The measurement apparatus body 110 may pre-store the gas pressure threshold and the first duration threshold. The gas pressure threshold and the first duration threshold may be specified by a technical person based on experience. After receiving the current gas pressure value of the gas bag 150 that is sent by the gas pressure sensor 140, the measurement apparatus body 110 may further determine whether the current gas pressure value of the gas bag 150 is equal to the preset gas pressure threshold. If the current gas pressure value is equal to the preset gas pressure threshold (for example, 30 mmHg), the measurement apparatus body 110 may determine the inflation duration in which the inflation component 130 inflates the gas bag 150. Then, the measurement apparatus body 110 may further determine whether the inflation duration of the gas bag 150 is greater than the preset first duration threshold. If the inflation duration of the gas bag 150 is greater than the preset first duration threshold, it indicates that the binding component 120 of the wearable blood pressure measurement apparatus worn by the user is too loose, and the measurement apparatus body 110 may display, on the display interface, prompt information indicating that the binding component 120 is too loose, to prompt the user to tighten the binding component 120 of the wearable blood pressure measurement apparatus.

The measurement apparatus body 110 is further configured to if the inflation duration is less than or equal to the preset first inflation duration threshold, measure an SBP and a DBP of the user by using the gas bag 150, the inflation component 130, and the gas pressure sensor 140.

During implementation, after determining the inflation duration in which the inflation component 130 inflates the gas bag 150, the measurement apparatus body 110 may further determine whether the inflation duration of the gas bag 150 is greater than the preset first duration threshold. If the inflation duration of the gas bag 150 is less than or equal to the preset first duration threshold, it indicates that the binding component 120 of the wearable blood pressure measurement apparatus worn by the user is not too loose, and the measurement apparatus body 110 may further measure a pulse wave of the user by using the inflation component 130, the gas pressure sensor 140, and the gas bag 150, and perform fitting processing on the pulse wave of the user to obtain the SBP and the DBP of the user.

Optionally, the measurement apparatus body 110 is further configured to compensate for the SBP and the DBP of the user based on the current pressure value of the binding component 120, the inflation duration of the gas bag 150, a preset second pressure threshold, a preset second duration threshold, and a preset compensation algorithm.

During implementation, the measurement apparatus body 110 may pre-store the second pressure threshold, the second duration threshold, and the compensation algorithm. The second pressure threshold, the second duration threshold, and the compensation algorithm may be specified by a technical person based on experience. After the measurement apparatus body 110 obtains the SBP and DBP of the user, to further ensure accuracy of blood pressure measurement, the measurement apparatus body 110 may compensate for the SBP and the DBP of the user based on the current pressure value of the binding component 120, the inflation duration of the gas bag 150, the preset second pressure threshold, the preset second duration threshold, and the preset compensation algorithm. For example, if the current pressure value of the binding component 120 is greater than the preset second pressure threshold or the inflation duration of the gas bag 150 is less than or equal to the preset second duration threshold, the measurement apparatus body 110 may perform positive compensation on the SBP and the DBP of the user based on the preset compensation algorithm. If the current pressure value of the binding component 120 is less than or equal to the preset second pressure threshold or the inflation duration of the gas bag 150 is greater than the preset second duration threshold, the measurement apparatus body 110 may perform negative compensation on the SBP and the DBP of the user based on the preset compensation algorithm.

This embodiment of this application provides a wearable blood pressure measurement apparatus. When receiving the blood pressure measurement instruction input by the user, the measurement apparatus body 110 collects the current pressure value of the binding component 120 by using the pressure sensor 160, and determines whether the current pressure value is greater than the preset first pressure threshold. If the current pressure value is greater than the first pressure threshold, the measurement apparatus body 110 reminds that the binding component 120 is too tight. If the current pressure value is less than or equal to the preset first pressure threshold, the measurement apparatus body 110 inflates the gas bag 150 by using the inflation component 130, and collects the current gas pressure value of the gas bag 150 by using the gas pressure sensor 140. When the current gas pressure value reaches the preset gas pressure threshold, the measurement apparatus body 110 determines the inflation duration of the gas bag 150, and determines whether the inflation duration is greater than the preset first duration threshold. If the inflation duration is greater than the preset first duration threshold, the measurement apparatus body 110 reminds that the binding component 120 is too loose. If the inflation duration is less than or equal to the preset first duration threshold, the measurement apparatus body 110 measures the systolic blood pressure (SBP) and the diastolic blood pressure (DBP) of the user by using the inflation component 130, the gas pressure sensor 140, and the gas bag 150. In this way, the wearable blood pressure measurement apparatus can detect, by using the inflation component 130, the gas pressure sensor 140, the gas bag 150, and the pressure sensor 160, a degree of tightness of the binding component 120 of the wearable blood pressure measurement apparatus worn by the user, thereby ensuring accuracy of blood pressure measurement.

Figure 4A:
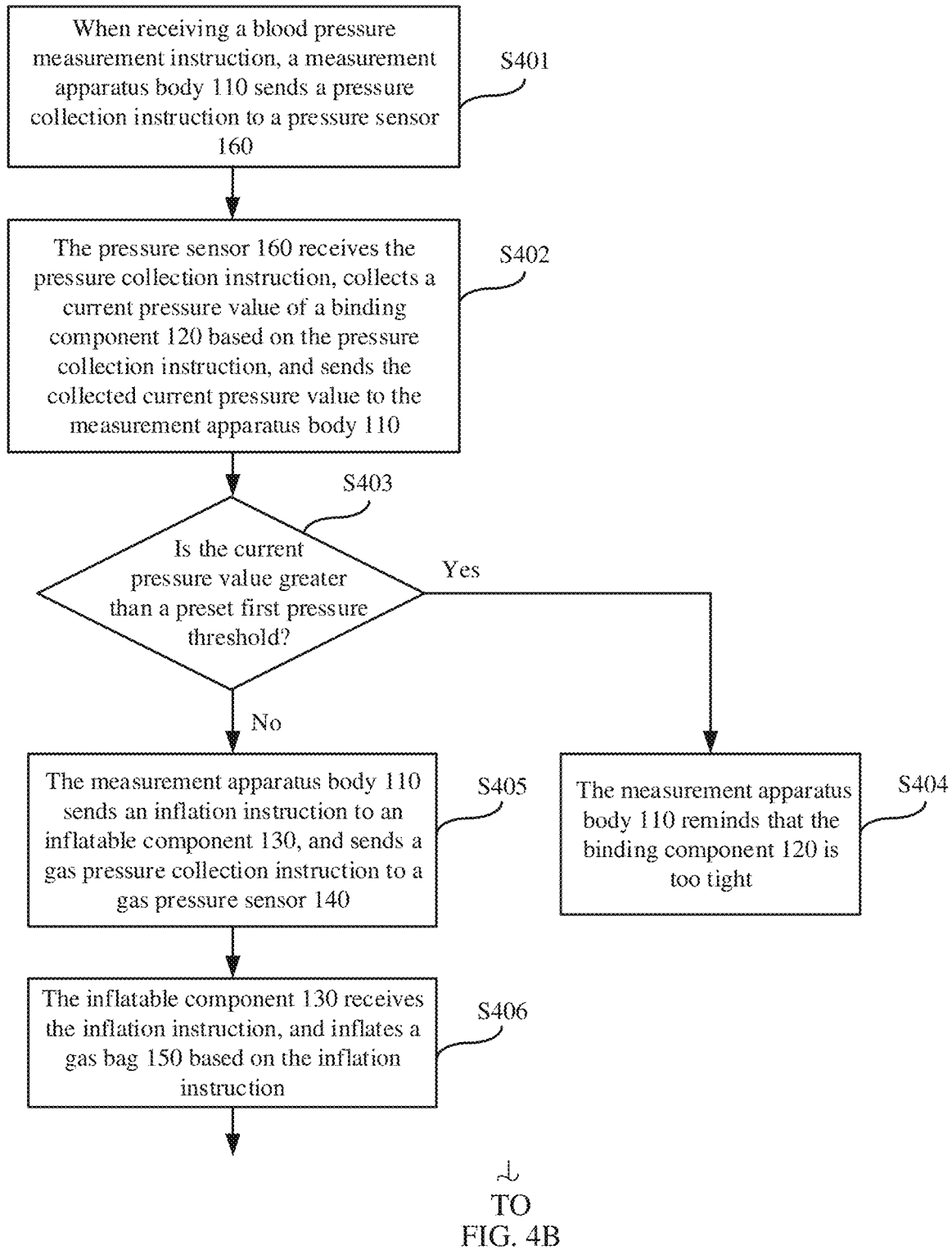
FIG. 4A and FIG. 4B show a blood pressure measurement method according to an embodiment of this application.
Figure 4B:
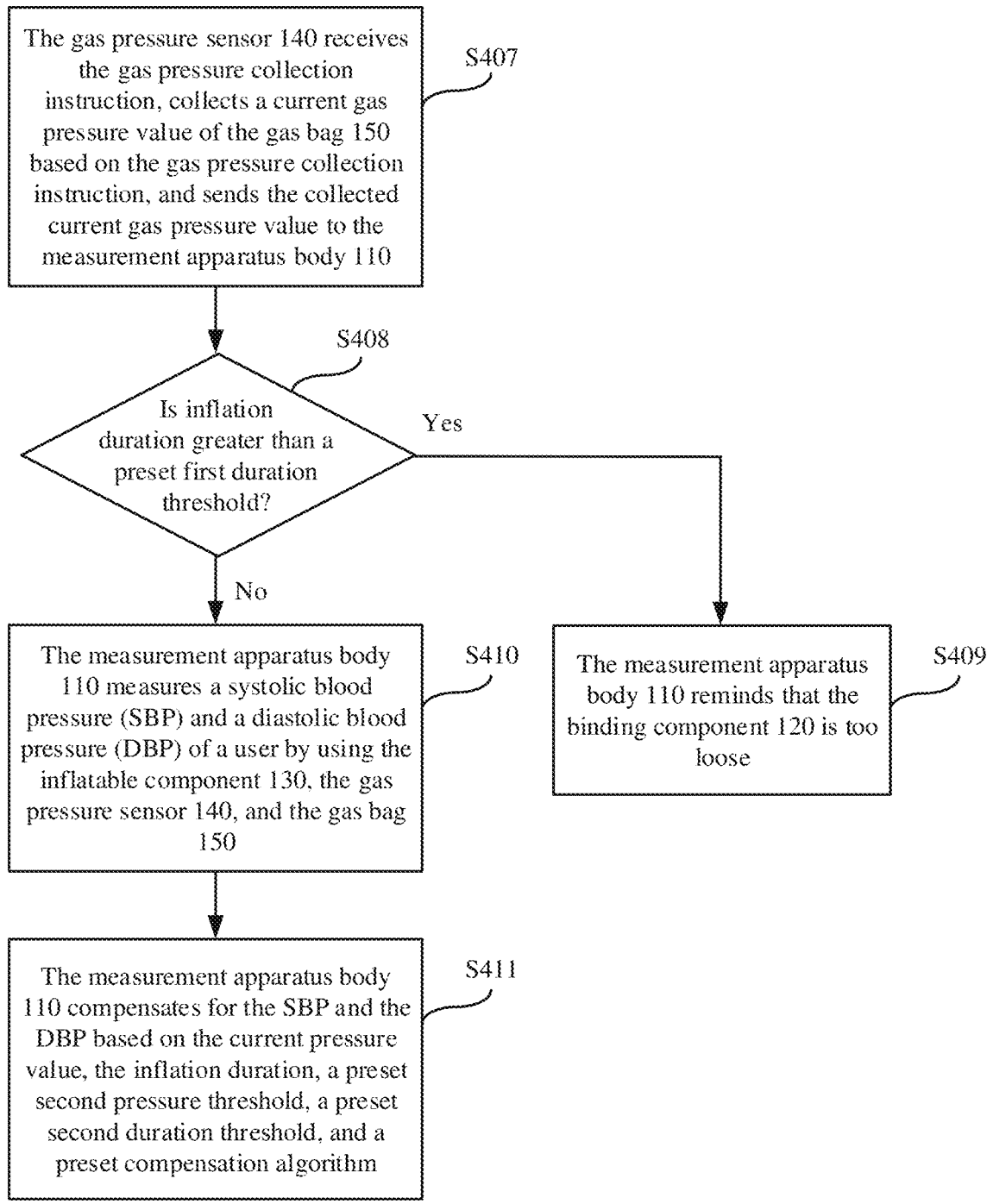

An embodiment of this application further provides a blood pressure measurement method. The method is applied to the foregoing wearable blood pressure measurement apparatus. As shown in FIG. 4A and FIG. 4B, a processing process of the method is as follows.

Step 401: When receiving a blood pressure measurement instruction, a measurement apparatus body 110 sends a pressure collection instruction to a pressure sensor 160.

Step 402: The pressure sensor 160 receives the pressure collection instruction, collects a current pressure value of a binding component 120 based on the pressure collection instruction, and sends the collected current pressure value to the measurement apparatus body 110.

Step 403: The measurement apparatus body 110 receives the current pressure value, and determines whether the current pressure value is greater than a preset first pressure threshold.

If the current pressure value is greater than the first pressure threshold, step 404 is performed. If the current pressure value is less than or equal to the preset first pressure threshold, step 405 is performed.

Step 404: The measurement apparatus body 110 reminds that the binding component 120 is too tight.

Step 405: The measurement apparatus body 110 sends an inflation instruction to an inflation component 130, and sends a gas pressure collection instruction to a gas pressure sensor 140.

Step 406: The inflation component 130 receives the inflation instruction, and inflates a gas bag 150 based on the inflation instruction.

Step 407: The gas pressure sensor 140 receives the gas pressure collection instruction, collects a current gas pressure value of the gas bag 150 based on the gas pressure collection instruction, and sends the collected current gas pressure value to the measurement apparatus body 110.

Step 408: The measurement apparatus body 110 receives the current gas pressure value, and when the current gas pressure value reaches a preset gas pressure threshold, determines inflation duration of the gas bag 150, and determines whether the inflation duration is greater than a preset first duration threshold.

If the inflation duration is greater than the preset first duration threshold, step 409 is performed. If the inflation duration is less than or equal to the preset first duration threshold, step 410 is performed.

Step 409: The measurement apparatus body 110 reminds that the binding component 120 is too loose.

Step 410: The measurement apparatus body 110 measures an SBP and a DBP of a user by using the inflation component 130, the gas pressure sensor 140, and the gas bag 150.

Step 411: The measurement apparatus body 110 compensates for the SBP and the DBP based on the current pressure value, the inflation duration, a preset second pressure threshold, a preset second duration threshold, and a preset compensation algorithm.

A processing process of blood pressure measurement in step 401 to step 411 is similar to a processing process of measuring a blood pressure by the foregoing wearable blood pressure measurement apparatus, and details are not described herein again.

This embodiment of this application provides a blood pressure measurement method. When receiving the blood pressure measurement instruction input by the user, the measurement apparatus body 110 collects the current pressure value of the binding component 120 by using the pressure sensor 160, and determines whether the current pressure value is greater than the preset first pressure threshold. If the current pressure value is greater than the first pressure threshold, the measurement apparatus body 110 reminds that the binding component 120 is too tight. If the current pressure value is less than or equal to the preset first pressure threshold, the measurement apparatus body 110 inflates the gas bag 150 by using the inflation component 130, and collects the current gas pressure value of the gas bag 150 by using the gas pressure sensor 140. When the current gas pressure value reaches the preset gas pressure threshold, the measurement apparatus body 110 determines the inflation duration of the gas bag 150, and determines whether the inflation duration is greater than the preset first duration threshold. If the inflation duration is greater than the preset first duration threshold, the measurement apparatus body 110 reminds that the binding component 120 is too loose. If the inflation duration is less than or equal to the preset first duration threshold, the measurement apparatus body 110 measures the systolic blood pressure (SBP) and the diastolic blood pressure (DBP) of the user by using the inflation component 130, the gas pressure sensor 140, and the gas bag 150. In this way, the wearable blood pressure measurement apparatus can detect, by using the inflation component 130, the gas pressure sensor 140, the gas bag 150, and the pressure sensor 160, a degree of tightness of the binding component 120 of the wearable blood pressure measurement apparatus worn by the user, thereby ensuring accuracy of blood pressure measurement.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A wearable blood pressure measurement apparatus, comprising:
   a measurement apparatus body;
   a binding component;
   an inflation component;
   a gas pressure sensor; and
   a gas bag disposed inside, or on an inner side of, the binding component, wherein the gas pressure sensor is connected, by a gas path to the gas bag;
   a binding component pressure sensor that is disposed inside, or on the inner side of, the binding component and that is separate from the gas pressure sensor;
   wherein the measurement apparatus body is connected to the binding component, the inflation component, the gas pressure sensor, and the binding component pressure sensor;
   wherein the gas bag is connected to the inflation component and the gas pressure sensor;
   wherein the binding component pressure sensor is configured to collect a current pressure value indicating a pressure at which the binding component holds the gas bag against a user while the gas bag is deflated, and wherein the binding component pressure sensor is further configured to send the collected current pressure value to the measurement apparatus body;
   wherein the measurement apparatus body is configured to receive the current pressure value, and is further configured to determine whether the current pressure value is greater than a preset first pressure threshold;
   wherein the inflation component is configured to inflate the gas bag in response to determining that the current pressure value is not greater than a preset first pressure threshold;
   wherein the gas pressure sensor is configured to collect a current gas pressure value of the gas bag in response to determining that the current pressure value is not greater than a preset first pressure threshold, and send the collected current gas pressure value to the measurement apparatus body;
   wherein the measurement apparatus body is further configured to receive the current gas pressure value, and when the current gas pressure value reaches a preset gas pressure threshold, determine inflation duration of the gas bag, and determine whether the inflation duration is greater than a preset first duration threshold; and wherein the measurement apparatus body, the inflation component, the gas pressure sensor, and the gas bag are further configured to measure, in response to determining that the inflation duration is greater than the preset first duration threshold, and further in response to determining that the current pressure value is not greater than a preset first pressure threshold, a systolic blood pressure (SBP) and a diastolic blood pressure (DBP) of a user.

2. The wearable blood pressure measurement apparatus according to claim 1, wherein the measurement apparatus body is further configured to send a pressure collection instruction to the binding component pressure sensor in response to receiving a blood pressure measurement instruction; and wherein the binding component pressure sensor is further configured to receive a pressure collection instruction generated by the measurement apparatus body, wherein the binding component pressure sensor being configured to collect the current pressure value comprises the binding component pressure sensor being configured to collect the current pressure value of the binding component based on the pressure collection instruction.

3. The wearable blood pressure measurement apparatus according to claim 1, wherein the measurement apparatus body is further configured to send an inflation instruction to the inflation component in response to the current pressure value being less than or equal to the preset first pressure threshold, and send a gas pressure collection instruction to the gas pressure sensor in response to the current pressure value being less than or equal to the preset first pressure threshold;

wherein the inflation component being configured to inflate the gas bag comprises the inflation component being further configured to receive the inflation instruction, and inflate the gas bag in response to the inflation instruction; and wherein the gas pressure sensor is further configured to receive the gas pressure collection instruction, wherein the gas pressure sensor being configured to collect the current gas pressure value of the gas bag comprises the gas pressure sensor being configured to collect the current gas pressure value of the gas bag based on the gas pressure collection instruction, and send the collected current gas pressure value to the measurement apparatus body.

4. The wearable blood pressure measurement apparatus according to claim 1, wherein the measurement apparatus body is further configured to notify, in response to determining that the current pressure value is greater than the first pressure threshold, the user that a watch band that is of the apparatus and that is the binding component, and that holds the gas bag against the user, is too tight.

5. The wearable blood pressure measurement apparatus according to claim 1, wherein the measurement apparatus body is further configured to: if the inflation duration is greater than the preset first duration threshold, remind that the binding component is too loose.

6. The wearable blood pressure measurement apparatus according to claim 1, wherein the measurement apparatus body is further configured to perform compensation on values measured for the SBP and the DBP based on the current pressure value, the inflation duration, a preset second pressure threshold, a preset second duration threshold, and a preset compensation algorithm.

7. The wearable blood pressure measurement apparatus according to claim 1, wherein the binding component pressure sensor is connected to the measurement apparatus body by a connection line, and the connection line is in a serpentine shape.

8. The wearable blood pressure measurement apparatus according to claim 1, wherein the inflation component and the gas pressure sensor are disposed in the measurement apparatus body.

9. The wearable blood pressure measurement apparatus according to claim 8, wherein the gas bag is separately connected to the inflation component and the gas pressure sensor by a gas path at the bottom or on a side surface of the measurement apparatus body.

10. A blood pressure measurement method, wherein the method is applied to a wearable blood pressure measurement apparatus, and the method comprises:

collecting, by a binding component pressure sensor, a current pressure value of a binding component, and sending, by the binding component pressure sensor, the current pressure value to a measurement apparatus body, wherein the measurement apparatus body is connected to the binding component, an inflation component, a gas pressure sensor, and a binding component pressure sensor, wherein a gas bag is disposed inside, or on an inner side of, the binding component, wherein the gas bag is connected to the inflation component and is further connected to the gas pressure sensor by a gas path, wherein the binding component pressure sensor is disposed inside, or on the inner side of, the binding component and that is separate from the gas pressure sensor, wherein the gas bag is connected to the inflation component and the gas pressure sensor, wherein the current pressure value of the binding component indicates a pressure at which the binding component holds the gas bag against a user while the gas bag is deflated;

receiving, by the measurement apparatus body, the current pressure value, and determining whether the current pressure value is greater than a preset first pressure threshold;

inflating, by the inflation component, the gas bag in response to determining that the current pressure value is not greater than a preset first pressure threshold;

collecting, by the gas pressure sensor, a current gas pressure value of the gas bag in response to determining that the current pressure value is not greater than a preset first pressure threshold, and sending the collected current gas pressure value to the measurement apparatus body;

receiving, by the measurement apparatus body, the current gas pressure value, and when the current gas pressure value reaches a preset gas pressure threshold, determining inflation duration of the gas bag, and determining whether the inflation duration is greater than a preset first duration threshold; and measuring, by the measurement apparatus body, the inflation component, the gas pressure sensor, and the gas bag, a systolic blood pressure (SBP) and a diastolic blood pressure (DBP) of a user, in response to determining that the inflation duration is greater than the preset first duration threshold, and further in response to determining that the current pressure value is not greater than a preset first pressure threshold.

11. The method according to claim 10, wherein the method further comprises:
sending, by the measurement apparatus body, in response to receiving a blood pressure measurement instruction, a pressure collection instruction to the binding component pressure sensor; and
receiving, by the binding component pressure sensor, the pressure collection instruction;
wherein the collecting the current pressure value of the binding component comprises collecting the current pressure value of the binding component in response to the pressure collection instruction, and sending the collected current pressure value to the measurement apparatus body.

12. The method according to claim 10, wherein the method further comprises:
sending, by the measurement apparatus body, in response to the current pressure value being less than or equal to the preset first pressure threshold, an inflation instruction to the inflation component, and sending, by the measurement apparatus body, in response to the current pressure value being less than or equal to the preset first pressure threshold, a gas pressure collection instruction to the gas pressure sensor;
wherein the inflating the gas bag comprises receiving, by the inflation component, the inflation instruction, and inflating the gas bag in response to receiving the inflation instruction; and
wherein the collecting the current gas pressure comprises receiving, by the gas pressure sensor, the gas pressure collection instruction, collecting the current gas pressure value of the gas bag in response to receiving the gas pressure collection instruction, and sending the collected current gas pressure value to the measurement apparatus body.

13. The method according to claim 10, wherein the method further comprises:
notifying, by the measurement apparatus body, in response to determining that the current pressure value is greater than the first pressure threshold, the user that the binding component is too tight.

14. The method according to claim 10, wherein the method further comprises:
notifying, by the measurement apparatus body, in response to the inflation duration being greater than the preset first duration threshold, the user that the binding component is too loose.

15. The method according to claim 10, wherein the method further comprises:
perform, by the measurement apparatus body, compensation on values measured for the SBP and the DBP based on the current pressure value, the inflation duration, a preset second pressure threshold, a preset second duration threshold, and a preset compensation algorithm.

16. A non-transitory computer storage medium, comprising computer instructions stored thereon for execution by a computer processor, wherein when the computer instructions are run on an electronic device, the electronic device is enabled to perform a blood pressure measurement method, wherein the computer instructions include instructions for:
collecting, by a binding component pressure sensor, a current pressure value of a binding component, and sending, by the binding component pressure sensor, the current pressure value to a measurement apparatus body, wherein the measurement apparatus body is connected to the binding component, an inflation component, a gas pressure sensor, and a binding component pressure sensor, wherein a gas bag is disposed inside, or on an inner side of, the binding component, wherein the gas bag is connected to the inflation component and is further connected to the gas pressure sensor by a gas path, wherein the binding component pressure sensor is disposed inside, or on the inner side of, the binding component and that is separate from the gas pressure sensor, wherein the gas bag is connected to the inflation component and the gas pressure sensor, wherein the current pressure value of the binding component indicates a pressure at which the binding component holds the gas bag against a user while the gas bag is deflated;
receiving, by the measurement apparatus body, the current pressure value, and determining whether the current pressure value is greater than a preset first pressure threshold;
inflating, by the inflation component, the gas bag in response to determining that the current pressure value is not greater than a preset first pressure threshold;
collecting, by the gas pressure sensor, a current gas pressure value of the gas bag in response to determining that the current pressure value is not greater than a preset first pressure threshold, and sending the collected current gas pressure value to the measurement apparatus body;
receiving, by the measurement apparatus body, the current gas pressure value, and when the current gas pressure value reaches a preset gas pressure threshold, determining inflation duration of the gas bag, and determining whether the inflation duration is greater than a preset first duration threshold; and
measuring, by the measurement apparatus body, the inflation component, the gas pressure sensor, and the gas bag, a systolic blood pressure (SBP) and a diastolic blood pressure (DBP) of a user, in response to determining that the inflation duration is greater than the preset first duration threshold, and further in response to determining that the current pressure value is not greater than a preset first pressure threshold.

17. A computer program product, wherein when the computer program product is run on a computer, the computer is enabled to perform the blood pressure measurement method according to claim 10.

* * * * *